United States Patent
Huang

(10) Patent No.: US 8,811,238 B2
(45) Date of Patent: Aug. 19, 2014

(54) METHOD AND SYSTEM FOR SYNCHRONIZING NETWORK NODES IN TIME DIVISION DUPLEX SYSTEM

(75) Inventor: Yada Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 171 days.

(21) Appl. No.: 13/258,314

(22) PCT Filed: May 7, 2010

(86) PCT No.: PCT/CN2010/072509
§ 371 (c)(1),
(2), (4) Date: May 29, 2012

(87) PCT Pub. No.: WO2010/148790
PCT Pub. Date: Dec. 29, 2010

(65) Prior Publication Data
US 2012/0236765 A1  Sep. 20, 2012

(30) Foreign Application Priority Data

Nov. 30, 2009  (CN) .............................. 200910205978

(51) Int. Cl.
*H04J 3/00* (2006.01)
*H04W 56/00* (2009.01)

(52) U.S. Cl.
CPC .................................. *H04W 56/002* (2013.01)
USPC ........... 370/280; 370/230; 370/235; 370/328; 370/338; 370/522

(58) Field of Classification Search
CPC .................................................... H04W 56/00
USPC .............. 370/230, 230.1, 235, 242, 252, 328, 370/338, 389, 522
See application file for complete search history.

(56) References Cited

U.S. PATENT DOCUMENTS 5,796,793 A * 8/1998 Kainulainen ................. 375/356
6,005,854 A * 12/1999 Xu et al. ...................... 370/335

(Continued)

FOREIGN PATENT DOCUMENTS

CN  1421075 A  5/2003
CN  101448313 A  6/2009

(Continued)

OTHER PUBLICATIONS

International Search Report in international application number: PCT/CN2010/072509, mailed on Sep. 2, 2010.

(Continued)

*Primary Examiner* — Andrew Lai
*Assistant Examiner* — Andrew C Lee
(74) *Attorney, Agent, or Firm* — Oppedahl Patent Law Firm LLC

(57) ABSTRACT

The disclosure discloses a method for synchronizing network nodes in a time division duplex system. The method includes that: a network node acquires the cell identity information of other network nodes, and inquires the synchronization status information of the other network nodes from a synchronization information node according to the cell identity information; the network node implements synchronization policy according to its own synchronization status and the inquired synchronization status of the other network nodes. A system for synchronizing the network nodes in the time division duplex system is also disclosed, which includes an acquiring unit (60), an inquiring unit (61) and a implementing unit (62).

25 Claims, 3 Drawing Sheets

(56) References Cited

U.S. PATENT DOCUMENTS

| | | | |
|---|---|---|---|
| 6,226,515 B1* | 5/2001 | Pauli et al. | 455/426.1 |
| 7,031,329 B2 | 4/2006 | Lipsanen | |
| 7,194,010 B2* | 3/2007 | Beasley et al. | 370/503 |
| 7,653,083 B2* | 1/2010 | Liu et al. | 370/466 |
| 7,813,311 B2* | 10/2010 | Dick et al. | 370/324 |
| 8,086,173 B2* | 12/2011 | Zhang et al. | 455/7 |
| 8,249,029 B2* | 8/2012 | Palanki et al. | 370/335 |
| 8,311,030 B2* | 11/2012 | Thakare | 370/350 |
| 8,582,450 B1* | 11/2013 | Robesky | 370/252 |
| 2001/0005361 A1* | 6/2001 | Lipsanen | 370/238 |
| 2002/0177460 A1* | 11/2002 | Beasley et al. | 455/502 |
| 2003/0076812 A1* | 4/2003 | Benedittis | 370/350 |
| 2003/0147362 A1* | 8/2003 | Dick et al. | 370/324 |
| 2004/0002334 A1* | 1/2004 | Lee et al. | 455/436 |
| 2007/0058706 A1* | 3/2007 | Seo | 375/222 |
| 2007/0129075 A1* | 6/2007 | Kim et al. | 455/436 |
| 2008/0240072 A1* | 10/2008 | Bykovnikov | 370/350 |
| 2009/0052430 A1 | 2/2009 | Gorokhov et al. | |
| 2009/0137246 A1 | 5/2009 | Xing et al. | |
| 2009/0175394 A1* | 7/2009 | Park et al. | 375/362 |
| 2009/0196277 A1* | 8/2009 | Horn et al. | 370/350 |
| 2010/0029274 A1* | 2/2010 | Deshpande et al. | 455/435.3 |
| 2010/0040015 A1* | 2/2010 | Ernstrom et al. | 370/330 |
| 2010/0054237 A1 | 3/2010 | Han et al. | |
| 2010/0067507 A1* | 3/2010 | Park | 370/338 |
| 2010/0178912 A1* | 7/2010 | Gunnarsson et al. | 455/423 |
| 2010/0278142 A1* | 11/2010 | Dwyer et al. | 370/331 |

FOREIGN PATENT DOCUMENTS

| | | |
|---|---|---|
| CN | 101494900 A | 7/2009 |
| WO | 2009075231 A1 | 6/2009 |
| WO | 2010027587 A1 | 3/2010 |

OTHER PUBLICATIONS

English Translation of the Written Opinion of the International Search Authority in international application number: PCT/CN2010/072509, mailed on Sep. 2, 2010.

Supplementary European Search Report in European application number: 10791296.6, mailed on Oct. 7, 2013.

R2-096000 Scenarios and requirements of TDD HeNB air interface synchronization Oct. 12, 2009.

* cited by examiner

METHOD AND SYSTEM FOR SYNCHRONIZING NETWORK NODES IN TIME DIVISION DUPLEX SYSTEM

TECHNICAL FIELD

The disclosure relates to a synchronizing technology of network nodes in a radio communication system, and in particular to a method and system for synchronizing the network nodes in a Time Division Duplex (TDD) system.

BACKGROUND

FIG. 1 shows a structural schematic view of a cellular radio communication system. As shown in FIG. 1, the cellular radio communication system mainly includes a terminal, an access network and a core network. The network formed by a base station or by a base station and a base controller is called a Radio Access Network (RAN) which is responsible for access layer service, is such as a radio resource management. Physical or logical connection may exist between base stations, such as a base station 1 and a base station 2 or a base station 3 in FIG. 1, according to the practical situation. Each base station can be connected with one or more Core Network (CN) nodes. The core network is responsible for non-access layer service, such as position updating, and is an anchor point of a user plane. User Equipment (UE) may be various types of equipment capable of communicating with a cellular radio communication network, such as a mobile phone and a notebook.

The cellular radio communication system is divided into a Frequency Division Dual (FDD) system and a TDD system by modes. Taking Long Term Evolution (LTE) as an example, uplink signals and downlink signals of the FDD system are transmitted on different frequency bands, while the uplink signals and the downlink signals of the TDD system are transmitted on the same frequency band. In a TDD system, uplink and downlink multiplex the same frequency band in a time division multiplexing mode. Because of the same-frequency time division multiplexing relationship between the uplink and the downlink of the TDD system, different cells of the TDD system need to be kept synchronous on an air interface; otherwise, mutual interference may be introduced when the uplink transmission and the downlink transmission of different cells are overlaid in time.

The air interface synchronization of the existing TDD system can be realized by global synchronization signals of a Global Positioning System (GPS) and an IEEE 1588v2 network synchronization protocol. The GPS synchronization may have very high precision, and has been widely used in a Time Division-Synchronous Code Division Multiple Access (TD-SCMDA) system. However, it is of high cost and cannot be used in the places which cannot receive GPS signals, for example, indoor places. The IEEE 1588v2 protocol can implement synchronization based on a terrestrial IP protocol. However, it has low synchronization precision and high requirements on the is time delay of a transmission network. It is difficult for the two synchronization solutions to meet using requirements in a home base station scene of the TDD system. In order to overcome the defects of the two solutions, another air interface monitoring-based synchronization solution is provided.

FIG. 2 shows a schematic view of synchronizing an unsynchronized base station to a synchronized base station. As shown in FIG. 2, an unsynchronized TDD base station (a TDD base station which is powered on just now, for example) searches cell signals via an air interface after being powered on, when signals of a synchronized cell(a macro cell of the TDD, for example, which usually adopts the GPS synchronization and the synchronization precision is highest) is received, an unsynchronized cell implements synchronization of the air interface by receiving and aligning the downlink synchronization signals of the synchronous cell. FIG. 3 shows a schematic view that the unsynchronized base station is synchronized through a multi-hop TDD air interface. As shown in FIG. 3, the synchronized base station 2 implements synchronization with the synchronized base station 1 according to air interface synchronization signals; and then, the unsynchronized base station and the synchronized base station 2 implement synchronization. Along with the increasing number of hops, the synchronization precision will decrease. Therefore, the synchronized base station with fewer hops is selected as far as possible when the unsynchronized base station selects a cell to be synchronized with. Therefore, based on this, each synchronized base station shall have a synchronization level n (the lower the level, the higher the precision; or the higher the level, the higher the precision), the synchronization level of a higher-level synchronized base station shall be level (n−1) and the synchronization level of a lower-level synchronized base station shall be level (n+1). The base station with the highest synchronization level is the TDD base station which adopts other high-precision synchronization, such as GPS synchronization, of non-air interface synchronization. When the unsynchronized base station receives signals from two different base stations, the base station with the highest synchronization level is selected according to the synchronization level.

In an air interface monitoring synchronization solution, the unsynchronized base station needs to be able to receive the synchronization signals of the synchronized cell and knows the synchronization status (being synchronous or not) and the synchronization level so as to select the synchronized base station with a higher synchronization level to achieve a better synchronization.

In the existing solution, a synchronized cell broadcasts the synchronization status and the synchronization level, and the unsynchronized cell reads the broadcasting of the synchronized cell so as to acquire the synchronization status and the synchronization level of the synchronized cell.

The solution has the following defects:

1) the overhead of the air interface increases due to the adding of the broadcasting information on the air interface;

2) the service interruption time of the air interface will increase due to the reading of the broadcasting message by the base station, since a base station cannot send signals for a UE serving for the present base station when the base station reads signals sent by another base station through the air interface. Because of the change of network topology, in particular the frequently switching of the home base station, the TDD base station needs to monitor the synchronization status and the synchronization level of the synchronized base station thereof in real time so as to implement a timely update; therefore, the service of the cell will be influenced frequently by interrupting the service to read the broadcasting message each time;

3) based on the consideration of safety and reliability, for an illegal base station or a base station which is set incorrectly, the unsynchronized base station monitoring these base stations cannot acknowledge the reliability of the broadcasting information acquired by the unsynchronized base station; and 4) based on the consideration of compatibility, for an old TDD base station or a base station of which the information cannot be broadcast by the air interface, the unsynchronized base station cannot implement synchronization with respect to the base stations.

SUMMARY

In view of the above, the main purpose of the disclosure is to provide a method and a system for synchronizing network nodes in a time division duplex system, which is able to acquire the synchronization status and the synchronization level of a base station through a terrestrial interface between the base station and a network, thereby facilitating the synchronization between an unsynchronized network node and a synchronized network node without occupying precious air interface resources.

In order to achieve the purpose, the technical solution of the disclosure is realized as follows:

a method for synchronizing network nodes in a time division duplex system, includes:

a network node acquiring cell identity information of other network nodes via a radio interface, and inquiring synchronization status information of the other network nodes from a synchronization information node according to the cell identity information; and the network node implementing a synchronization policy according to its own synchronization status and the an inquired synchronization status of the other network nodes.

Preferably, the synchronization status at least includes: being synchronous or not, and/or a synchronization level;

the synchronization policy includes: when the network node is unsynchronized, the synchronization being implemented by the network node having a highest synchronization level in the other network nodes; or when the network node is synchronized, the synchronization being implemented by the network node, which has a highest synchronization level and has a synchronization level at least two levels higher than that of the is network node, in the other network nodes.

Preferably, the method further includes that:

after synchronization is done, the network node informing the synchronization information node of the information of a network node with which the network node is synchronized;

when a synchronization status of the network node with which the network node is synchronized changes, the synchronization information node informing the network node of the changed synchronization status; and the network node modifying its own synchronization status.

Preferably, the modifying its own synchronization status by the network node includes:

when the synchronization status of the network node with which the network node is synchronized is asynchronism, the network node modifies its own synchronization status to be asynchronism; and when a synchronization level of the network node with which the network node is synchronized changes, the network node modifies its own synchronization level.

Preferably, the synchronization information node is a centre network node or the other network nodes.

Preferably, the cell identity is a physical cell identity and cell carrier frequency information of a cell, or a global cell identity of a cell.

Preferably, the cell identity information is acquired by measuring or by reading cell broadcasting information.

A system for synchronizing network nodes in a time division duplex system, includes:

an acquiring unit configured to acquire a cell identity information of other network nodes;

an inquiring unit configured to inquire synchronization information of the other network nodes from a synchronization information node according to the cell identity information acquired by the acquiring unit; and an implementing unit configured to implement a synchronization policy according to a synchronization status of the current network node and an inquired synchronization status of the other network nodes.

Preferably, the synchronization status at least includes: being synchronous or not, and/or a synchronization level; and the synchronization policy includes: when the current network node is unsynchronized, the current network node is synchronized with a network node having a highest synchronization level in the other network nodes; or when the current network node is synchronized, the current network node is synchronized with a network node, which has a highest synchronization level and has a synchronization level at least two levels higher than that of the current network node, in the other network nodes.

Preferably, the system further includes a first informing unit, a second informing unit and a synchronization status modifying unit, wherein the first informing unit is configured to inform the synchronization information node of information of the network node to which the synchronization is implemented after the implementing unit implements the synchronization;

the second informing unit is disposed in the synchronization information node and is configured to inform the synchronization status modifying unit of a changed synchronization status when the synchronization status of the network node with which the current network node is synchronized changes; and the synchronization status modifying unit is configured to modify the synchronization status of the current network node.

Preferably, the synchronization status modifying unit is further configured to modify the synchronization status of the current network node to be asynchronism when the synchronization status of the network node with which the current network node is synchronized is determined to be asynchronism; and the synchronization status modifying unit is further configured to modify a synchronization level of the current network node when the synchronization level of the network node with which the current network node is synchronized changes.

Preferably, the synchronization information node is a centre network node or the other network nodes.

Preferably, the cell identity is a physical cell identity and cell carrier frequency information of a cell, or a global cell identity of a cell.

Preferably, the cell identity information is acquired by measuring or by reading cell broadcasting information.

In the disclosure, after monitoring the synchronization signals of other network nodes, the unsynchronized network node acquires the identity information of the other network nodes according to the synchronization signals; the unsynchronized network node acquires a synchronization status and a synchronization level of the other network nodes through the interface between the network node and a network side so as to determine the synchronized network node to be synchronized with and implement synchronization with the synchronized network node; or the unsynchronized network node acquires the synchronization status and the synchronization level of the synchronized network node through the terrestrial interface between the network nodes and implements synchronization with the synchronized network node. According to the method, the synchronization status and the synchronization level of a synchronized network node can be acquired without an air interface, thereby saving the air interface resources of a network node. The present disclosure has provided a simple and practical technical solution.

DETAILED DESCRIPTION

The basic idea of the disclosure is that: after monitoring synchronization signals of other network nodes, an unsynchronized network node acquires identity information of the other network nodes according to the synchronization signals. The unsynchronized network node acquires a synchronization status and a synchronization level of the other network nodes through an interface between a network node and a network side so as to determine a synchronized network node to be synchronized with and implement synchronization with the synchronized network node; or the unsynchronized acquires the synchronization status and the synchronization level of the synchronized network node through a terrestrial interface between network nodes and implements synchronization with the synchronized network node. According to the method of the present disclosure, the synchronization status and the synchronization level of a synchronized network node are acquired without an air interface, thereby saving air interface resources of a network node. The present disclosure has provided a simple and practical technical solution.

In order make the purpose, the technical solution and the advantage of the disclosure more clear, the disclosure is described below with reference to embodiments and the accompanying drawings in detail.

The synchronization information, such as the synchronization status and the synchronization level, of the TDD base station in the disclosure are both stored on network side. After acquiring the identity information, such as the Physical Cell Identity (PCI) and the cell frequency or the Global Cell Identity (GCI), of a target base station by monitoring through an air interface or by broadcast reading, the unsynchronized base station inquires the synchronization information of the cell via a terrestrial interface or a network side interface so as to determine a synchronized base station to be synchronized with currently and implement synchronization.

First Embodiment

Figure 1:
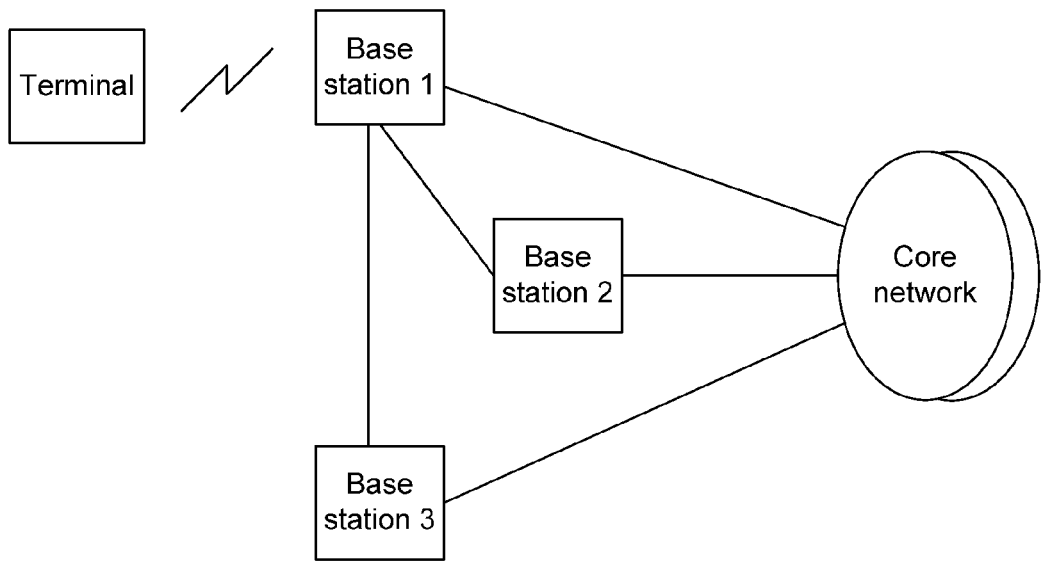
FIG. 1 shows a structural schematic view of a cellular radio communication system.
Figure 2:
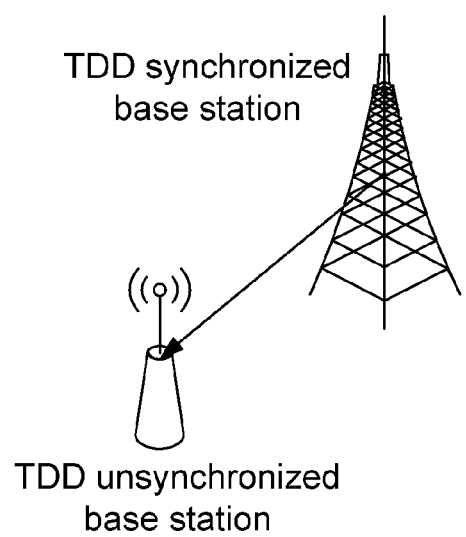
FIG. 2 shows a schematic view of synchronizing an unsynchronized base station with a synchronized base station.
Figure 3:
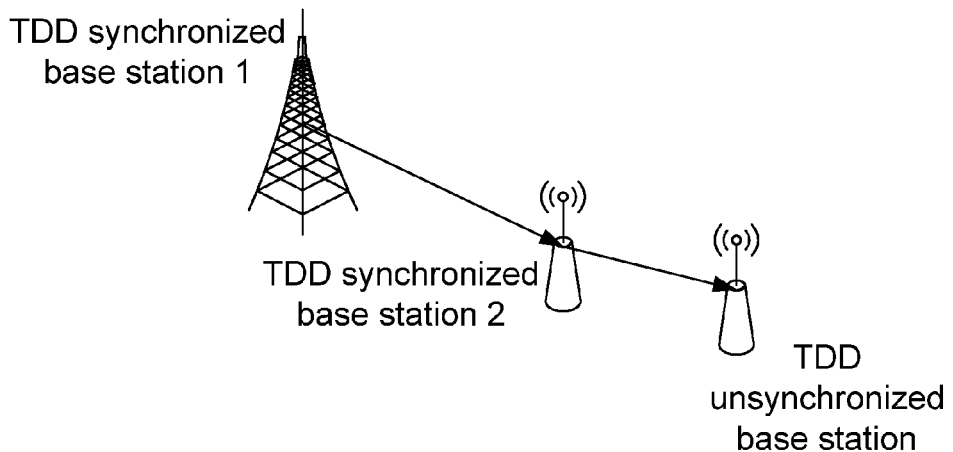
FIG. 3 shows a schematic view that the unsynchronized base station is synchronized through a multi-hop TDD air interface.
Figure 4:
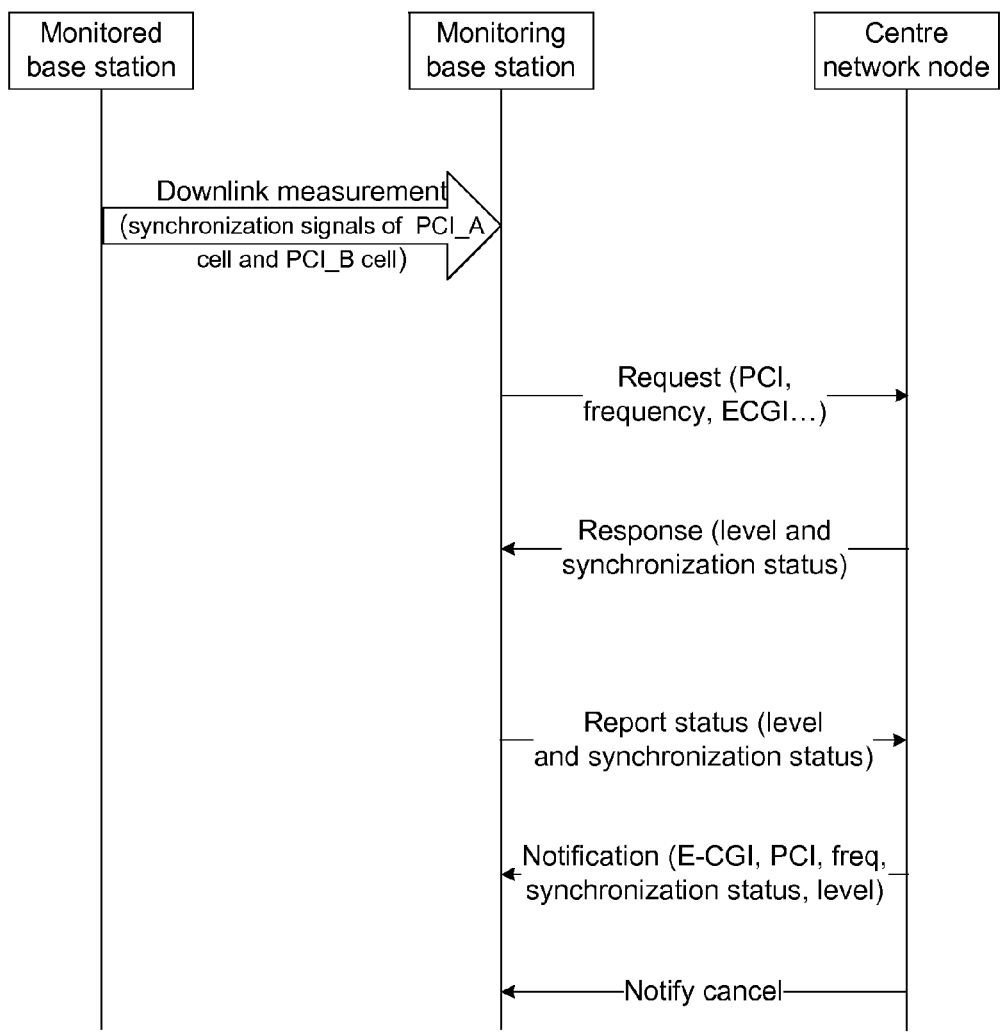
FIG. 4 shows a flowchart of a first embodiment of the method for synchronizing network nodes in the time division duplex system of the disclosure.

FIG. 4 shows a flowchart of a first embodiment of the method for synchronizing network nodes in the time division duplex system of the disclosure. As shown in FIG. 4, the unsynchronized TDD base station serves as a monitoring base station and receives synchronization signals of the monitored base stations in a monitoring process. The monitoring process is similar to a common measuring process of UE; and through measurement, the monitoring base station is able to monitor the synchronization signals of PCI_A cell and PCI_B cell in the monitored base station. Through measurement, the monitoring base station acquires the cell identify information of the cell of the monitored base station, such as the PCI of the PCI_A cell and the PCI_B cell and the carrier frequency information of the cells. The monitoring base station sends a centre network node (such as an Operation And Maintain (OAM) entity) a synchronization information request (Request) message which includes one or more pieces of cell identity information of the cells of the monitored base station. The OAM entity inquires the synchronization information of the monitored base station or cells thereof. After a successful inquiry, the centre network node returns a synchronization is information response (Response) message to the monitored base station to notify the synchronization information of the inquired cell or the base station in which the inquired cell is located. The synchronization information includes whether synchronized or not, and the synchronization level when synchronized. The monitoring base station selects a synchronized base station, with the highest synchronization level, in the synchronized base stations as the synchronization object according to the acquired synchronization information of the monitored base stations. When there are a multiple of synchronized base stations with the highest synchronization level, the monitoring base station selects one of the synchronized base stations, for example, the base station with the highest signal receiving strength is selected for synchronization. The disclosure does not limit the mode of selecting the synchronized base station, so any one of the synchronized base stations with the highest synchronization level can also be selected for synchronization.

After selecting the synchronized base station, the monitoring base station monitors the air interface synchronization signals thereof and implements synchronization. After synchronization is done, the monitoring base station sets its own synchronization status to be synchronization, and sets its own synchronization level to be level (n+1) according to the synchronization level n of the monitored base station, and reports its own synchronization information to the centre network node so as to be able to be inquired by the base station intending to monitor the monitoring base station.

As shown in FIG. 4, the monitoring base station can further send a report status (Report status) message to the centre network node, and informs the centre network node of the information, namely the identity information of the synchronized base station, of the synchronized base station monitored by the monitoring base station. The centre network node returns the notification (Notification) message to the monitoring base station, and informs the monitoring base station of the synchronization information of the monitored base station monitored by the monitoring base station. When the is synchronization status of the synchronized base station monitored by the monitoring base station, namely the monitored base station, changes, the centre network node may notify the monitoring base station to implement corresponding synchronization status modification. When the synchronization status of the monitored base station monitored by the monitoring base station changes to be asynchronism, e.g., the machine is shut off, the centre network node will notify the corresponding monitoring base station to change its own status to be asynchronism correspondingly, and repeats the network synchronization or selects another one of the candidate monitoring base stations as the base station to be synchronized with. When the synchronization level of the monitored base station changes, for example, from level n to level m, the monitoring base station needs to accordingly adjust its own synchronization level to be level (m+1).

As shown in FIG. 4, in the monitoring status, the monitoring base station sends a Notify cancel message to the centre network node to cancel the notification of the synchronization information of the monitored base station from the centre network node, and the centre network node will not notify the monitoring base station when the synchronization information of the monitored base station changes.

The above centre network node may be network nodes, such as an OAM management node, a Mobility Management Entity (MME), a Serving Gateway (S-GW)/Packet Data Network Gateway (PGW) node and a base station gateway (H(e) NB GW).

The cell identity above is the PCI and the carrier frequency information of the monitored cell, or the Global Cell Identity (GCI) information of the cell. The cell of the monitored base station can be identified uniquely by the cell identity in the whole network.

In the above inquiry process, the information of a multiple of monitored cells may be included simultaneously. The centre network node can also return the synchronization information of the multiple of the monitored cells simultaneously.

It should be noted that the base station synchronization solution shown in FIG. 4 is also applicable to the synchronized base station. When a synchronized base station has monitored the synchronization signals of other base station cells, the synchronized base station inquires a synchronization status of the other base stations according to the acquired cell identity information. When determining the synchronization level of one of the other base stations is two levels higher than its own, the current synchronized base station is synchronized with the base station with a synchronization level which is two levels higher than that of the current synchronized base station. When a multiple of the base stations have the synchronization levels which are two levels higher than that of the current synchronized base station, one of the base stations is selected for synchronization according to the above mentioned manner, for example, by selecting randomly any one of the base stations or by selecting the base station with the strongest signal receiving strength. The implementing manner is completely the same as that of the flow shown in FIG. 4, which is therefore not detailed here.

Figure 5:
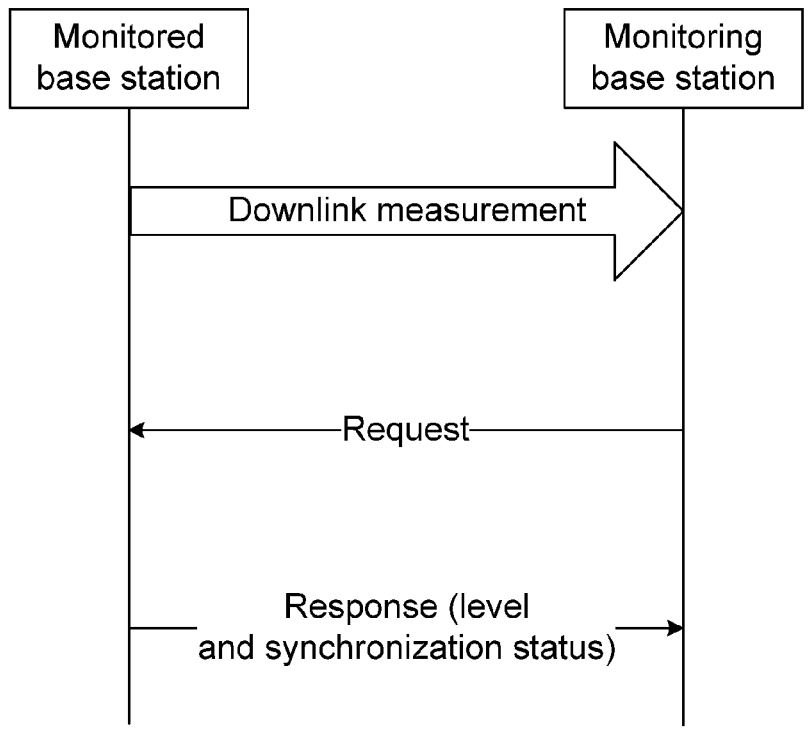
FIG. 5 shows a flowchart of a second embodiment of the method for synchronizing network nodes in the time division duplex system of the disclosure.

FIG. 5 shows a flowchart of a second embodiment of the method for synchronizing the network nodes in the time division duplex system of the disclosure. As shown in FIG. 5, the second embodiment differs from the first embodiment in that: the synchronization information in the first embodiment is intensively managed by a centre node, whereas the synchronization information in the second embodiment is stored by each base station in a distributed manner. The monitoring base station directly acquires the synchronization information of the monitored base station through the terrestrial interface between the base stations. After acquiring the physical layer identity, such as the PCI, of the monitored base station through the air interface, by combining the physical layer identity with frequency point information, the monitoring base station acquires the terrestrial interface address, such as an X2 interface address, of the monitored base station according to a neighbour cell relationship. The monitoring base station requests the monitored base station to return the synchronization information of the monitored base station by directly sending a synchronization information request (Request) message to the monitored base station. The synchronization information includes the synchronization status information and the synchronization level information. The monitoring base station may simultaneously send a multiple of Request messages to a multiple of monitored base stations. The neighbour cell relationship includes a Stream Control Transmission Protocol (SCTP) port corresponding to the terrestrial interface information, such as a related IP address, of the neighbour cells. The neighbour cell relationship may be preconfigured to a monitoring base station, for example, preconfigured through an OAM system, or can be acquired by the monitoring base station by inquiring the centre network node of the configuration information of the monitored base station.

The monitoring base station acquires the synchronization information of the monitored base station according to the synchronization information response (Response) message returned by the monitored base station, and selects the synchronized base station with the highest synchronization level according to the synchronization information.

After selecting the synchronized base station, the monitoring base station monitors the air interface synchronization signal of the selected base station and implements synchronization. After the synchronization is done, the monitoring base station sets the its own synchronization status to be synchronization, sets its own synchronization level to be level (n+1) according to the synchronization level n of the monitored base station, and reports its own synchronization information to the centre network node so as to be inquired by the base station intending to monitor the monitoring base station.

After selecting the monitored base station to be synchronized with, the monitoring base station may notify through a Report Status message the monitored base station that its synchronization status is monitored by the current base station. When the synchronization status of the monitored base station changes, the monitoring base station (may be multiple monitoring base stations at the same time) is notified to modify its own synchronization information. The monitoring base station may also cancel the notify message sent to the monitored base station through a Notify Cancel message, and the monitored base station will not notify the monitoring base station of the changes of its synchronization information.

It should be noted that the base station synchronization solution shown in FIG. 5 is also applicable to the synchronized base station. When a synchronized base station has monitored synchronization signals of other base station cells, the synchronized base station inquires a synchronization status of the other base stations according to the acquired cell identity information. When determining the synchronization level of the other base stations is two levels higher than its own, the current synchronized base station is synchronized with the base station with a synchronization level which is two levels higher than that of the current synchronized base station. When a multiple of the base stations have the synchronization levels which are two levels higher than that of the current synchronized base station, one of the base stations is selected for synchronization according to the above mentioned manner, for example, by selecting randomly any one of the base stations or by selecting the base station with the strongest signal receiving strength. The implementing manner is completely the same as that of the flow shown in FIG. 5, which is therefore not detailed here.

Figure 6:
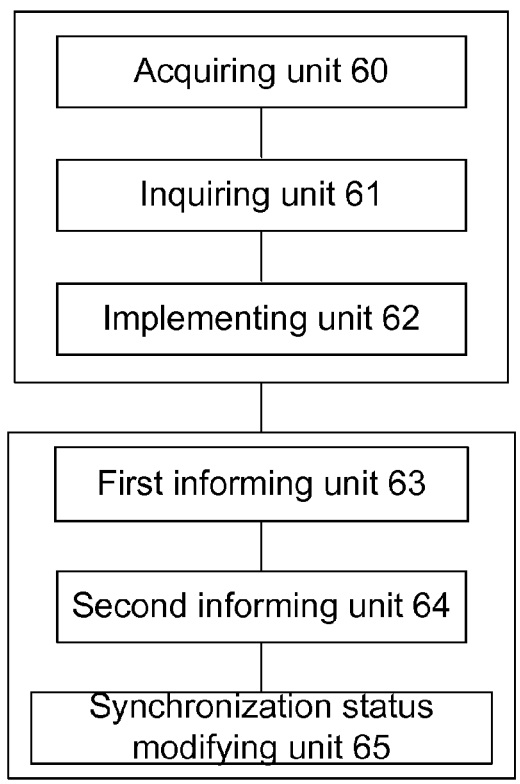
FIG. 6 shows a structural schematic view of the system for synchronizing network nodes in the time division duplex system of the disclosure.

FIG. 6 shows a structural schematic view of the system for synchronizing the network nodes in the time division duplex system of the disclosure. As shown in FIG. 6, the system for synchronizing the network nodes in the time division duplex system of the disclosure includes an acquiring unit 60, an inquiring unit 61 and an implementing unit 62. The acquiring unit 60 is configured to acquire cell identity information of other network nodes. The inquiring unit 61 is configured to inquire synchronization status information of is the other network nodes from a synchronization information node according to the cell identity information acquired by the acquiring unit 60. The implementing unit 62 is configured to implement a synchronization policy according to a synchronization status of a current network node and the inquired synchronization status of the other network nodes. The synchronization status at least includes: whether in a synchronization status, and/or a synchronization level. The synchronization policy includes: when the current network node is unsynchronized, the current network node is synchronized with a network node having a highest synchronization level in the other network nodes; and when the current network node is synchronized, the current network node is synchronized with a network node, which has a highest synchronization level and has a synchronization level at least two levels higher than that of the current network node, in the other network nodes.

As shown in FIG. 6, the system for synchronizing the network nodes in the time division duplex system of the disclosure further includes a first informing unit 63, a second informing unit 64 and a synchronization status modifying unit 65. The first informing unit 63 is configured to inform the synchronization information node of information of the network node to be synchronized with after the implementing unit 62 implements the synchronization. The second informing unit 64 is disposed in the synchronization information node and is configured to inform the synchronization status modifying unit 65 of the changed synchronization status when the synchronization status of the network node with which the current network node is synchronized changes. The synchronization status modifying unit 65 is configured to modify the synchronization status of the current network node. Further, the synchronization status modifying unit 65 modifies the synchronization status of the current network node to be asynchronism when the synchronization status of the network node, with which the current network node is synchronized, is determined to be asynchronism; and when the synchronization status modifying unit 65 determines that the synchronization level of the network node, with which the current network node is synchronized, changes, the network node modifies its own synchronization level.

In the disclosure, the synchronization information node is the centre network node or the other network nodes; and the cell identity includes the physical cell identity and the cell carrier frequency information of the cell or the global cell identity.

The acquiring unit 60 acquires the cell identity information by measuring or by reading cell broadcasting information.

It should be understood by those skilled in the art that the system for synchronizing the network nodes in the time division duplex system as shown in FIG. 6 is designed for implementing the forenamed method for synchronizing the network nodes in the time division duplex system. The functions of each processing unit as shown in FIG. 6 can be understood from the description of the first embodiment and the second embodiment; and the functions of each processing unit can be implemented through the programs operated on a processor or can be implemented by specific logic circuits. It should be understood by those skilled in the art that the first informing unit 63, the second informing unit 64 and the synchronization status modifying unit 65 as shown in FIG. 6 are all designed for optimizing the technical solution of the disclosure, which are not essential technical features for implementing the technical solution of the disclosure.

The above is only the preferred embodiment of the disclosure and not intended to limit the scope of protection of the disclosure.

The invention claimed is:

1. A method for synchronizing network nodes in a time division duplex system, comprising:
   acquiring, by a network node, cell identity information of other network nodes via a radio interface, and inquiring synchronization status information of the other network nodes from a synchronization information node according to the cell identity information; and
   implementing, by the network node, a synchronization policy according to a synchronization status of the network node and an inquired synchronization status of the other network nodes, wherein the synchronization status at least comprises: being synchronous or not, and/or a synchronization level; and the synchronization policy comprises: when the network node is asynchronous, the network node is synchronized with a network node having a highest synchronization level amongst the other network nodes, or when the network node is synchronous, the network node is synchronized with a network node which has a highest synchronization level and has a synchronization level at least two levels higher than a synchronization level of the network node amongst the other network nodes.

2. The method according to claim 1, wherein the synchronization status at least comprises: being synchronous or not, and/or a synchronization level.

3. The method according to claim 2, wherein the synchronization information node is a centre network node or the other network nodes.

4. The method according to claim 1, further comprising:
   after synchronization is done, informing, by the network node, the synchronization information node of synchronization status information of a network node with which the network node is synchronized;
   when a synchronization status of the network node with which the network node is synchronized changes, informing, by the synchronization information node, the network node of the changed synchronization status; and
   modifying, by the network node, the synchronization status of the network node.

5. The method according to claim 4, wherein the network node modifying the synchronization status of the network node comprises:
   when the synchronization status of the network node with which the network node is synchronized is asynchronism, the network node modifying the synchronization status of the network node to be asynchronism; and
   when a synchronization level of the network node with which the network node is synchronized changes, the network node modifying its own synchronization level.

6. The method according to claim 5, wherein the synchronization information node is a centre network node or the other network nodes.

7. The method according to claim 4, wherein the synchronization information node is a centre network node or the other network nodes.

8. The method according to claim 1, wherein the synchronization information node is a centre network node or the other network nodes.

9. The method according to claim 1, wherein the cell identity is a physical cell identity and cell carrier frequency information, or a global cell identity of a cell.

10. The method according to claim 9, wherein the cell identity information is acquired by measuring or by reading cell broadcasting information.

11. A system for synchronizing network nodes in a time division duplex system, comprising:
an acquiring unit configured to acquire a cell identity information of other network nodes via a radio interface;
an inquiring unit configured to inquire synchronization status information of the other network nodes from a synchronization information node according to the cell identity information acquired by the acquiring unit; and
an implementing unit configured to implement a synchronization policy according to a synchronization status of the network node and an inquired synchronization status of the other network nodes, wherein the synchronization status at least comprises: being synchronous or not, and/or a synchronization level; and the synchronization policy comprises: when the network node is asynchronous, the network node is synchronized with a network node having a highest synchronization level amongst the other network nodes, or when the network node is synchronous, the network node is synchronized with a network node which has a highest synchronization level and has a synchronization level at least two levels higher than a synchronization level of the network node amongst the other network nodes.

12. The system according to claim 11, further comprising a first informing unit, a second informing unit and a synchronization status modifying unit,
wherein the first informing unit is configured to inform the synchronization information node of information of the network node to be synchronized with after the implementing unit implements the synchronization;
the second informing unit is disposed in the synchronization information node and is configured to inform the synchronization status modifying unit of a changed synchronization status when the synchronization status of the network node with which the network node is synchronized changes;
and the synchronization status modifying unit is configured to modify the synchronization status of the network node.

13. The system according to claim 12, wherein the synchronization status modifying unit is further configured to modify the synchronization status of the network node to be asynchronism when the synchronization status of the network node with which the network node is synchronized is determined to be asynchronism; and
the synchronization status modifying unit is further configured to modify a synchronization level of the network node when the synchronization level of the network node with which the network node is synchronized changes.

14. The system according to claim 13, wherein the synchronization information node is a centre network node or the other network nodes.

15. The system according to claim 14, wherein the cell identity is a physical cell identity and cell carrier frequency information, or a global cell identity of a cell.

16. The system according to claim 15, wherein the acquiring unit acquires the cell identity information by measuring or by reading cell broadcasting information.

17. The system according to claim 12, wherein the synchronization information node is a centre network node or the other network nodes.

18. The system according to claim 17, wherein the cell identity is a physical cell identity and cell carrier frequency information, or a global cell identity of a cell.

19. The system according to claim 18, wherein the acquiring unit acquires the cell identity information by measuring or by reading cell broadcasting information.

20. The system according to claim 11, wherein the synchronization information node is a centre network node or the other network nodes.

21. The system according to claim 20, wherein the cell identity is a physical cell identity and cell carrier frequency information, or a global cell identity of a cell.

22. The system according to claim 21, wherein the acquiring unit acquires the cell identity information by measuring or by reading cell broadcasting information.

23. The system according to claim 11, wherein the synchronization information node is a centre network node or the other network nodes.

24. The system according to claim 23, wherein the cell identity is a physical cell identity and cell carrier frequency information, or a global cell identity of a cell.

25. The system according to claim 24, wherein the acquiring unit acquires the cell identity information by measuring or by reading cell broadcasting information.

* * * * *